July 18, 1939.    E. C. DERKS    2,166,343
SCOURING APPARATUS
Filed June 1, 1936
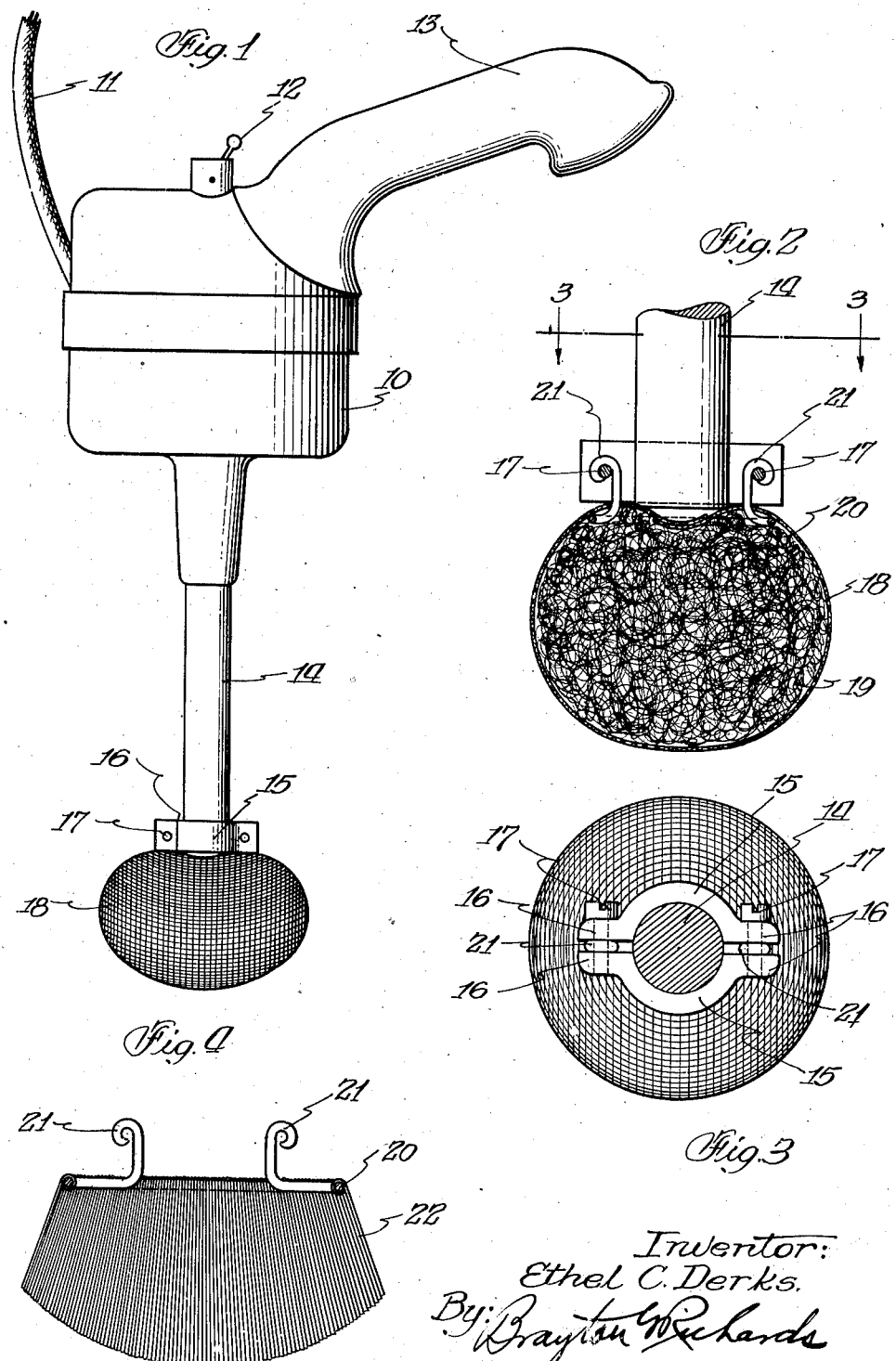
Inventor:
Ethel C. Derks.
By: Brayton Richards
Attorney.

Patented July 18, 1939

2,166,343

UNITED STATES PATENT OFFICE 2,166,343

SCOURING APPARATUS

Ethel C. Derks, Ryderwood, Wash.

Application June 1, 1936, Serial No. 82,872

2 Claims. (Cl. 15—230)

The invention relates to improvements in scouring apparatus, especially adapted for use in the kitchen in scouring kitchen utensils, which is of simple construction and highly efficient in use.

Another object of the invention is the provision of an apparatus of the character indicated which may be readily manipulated with one hand.

Another object of the invention is the provision of an improved apparatus of the character indicated so constructed and arranged as to permit the ready removal, renewal and replacement of the scouring element.

Other objects will appear hereinafter.

The invention consists in the combinations and arrangements of parts hereinafter described and claimed.

The invention will be best understood by reference to the accompanying drawing forming a part of this specification and in which Fig. 1 is a side view of scouring apparatus embodying the invention;

Fig. 2 an enlarged detailed section taken through the scouring element;

Fig. 3 a section taken substantially on line 3—3 of Fig. 2; and

Fig. 4 a detailed view of a modified form of scouring element.

The embodiment of the invention illustrated in Figs. 1, 2 and 3 comprises a suitable motor casing 10 containing an electric motor of suitable construction and arrangement and supplied with electric current through a flexible cord 11. The motor switch 12 is arranged at the top of the casing 10 in cooperatve relationship with an operating handle 13, preferably of insulating material, and projecting upwardly and laterally from the top of the casing 10 in cooperative relationship with the switch 12 so as to permit of the manipulation of said switch by means of a thumb or finger of the hand holding the handle 13. The shaft 14 of the enclosed electric motor is arranged to project downwardly through the bottom of the casing 10, as shown. Two substantially semi-cylindrical clamping members 15 are arranged as shown to embrace the lower end of the shaft 14 and are provided with perforated and threaded ears or lugs 16 to receive clamping screws 17 and whereby said clamping members may be readily and securely clamped to the lower end of the shaft 14, as will be readily understood.

A copper mesh bag 18 is filled with copper filings or turnings 19 is provided at its top with an angular ring 20 having two hook members 21 projecting upwardly therefrom, as shown. The hook members 21 are adapted and arranged to engage the clamping screws 17 between the lugs 16 so that when said clamping screws are tightened to clamping members 15 on the shaft 14 they will also securely clamp the hooks 21 between them, thus providing a simple and effective means for detachably securing the scouring bag 18 to the bottom of the motor shaft 14. By this arrangement a scouring apparatus is provided which may be conveniently and effectively utilized in the kitchen for scouring pans, dishes, etc. The arrangement is such that the apparatus may be conveniently manipulated with one hand and the scouring bag 18 readily removed, renewed or replaced as desired. The specific form and arrangement of parts disclosed constitutes a simple and effective one for the purpose.

The modified form of scouring element illustrated in Fig. 4 comprises a brush member having steel bristles or brushes 22 secured as indicated to the ring 20, equipped with the hooks 21 for attachable connection with the motor shaft 14, so that said scouring element may be substituted when and if desired for the scouring bag 18, as will be readily understood.

While I have illustrated and described the preferred forms of construction for carrying my invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A scouring device comprising a shaft, clamping members engaging the shaft and provided with clamping screws for clamping the same to the shaft, a scouring pad having a cover, a ring mounted within said cover, a pair of hooks extending upwardly from the opposite sides of the ring and through the scouring pad cover, said hooks engaging the clamping screws between said clamping members.

2. A device of the kind described comprising clamping members adapted to engage the end of a shaft and provided with clamping screws for attaching the same on the shaft, a covered scouring pad a ring horizontally disposed with respect to the shaft and mounted within the cover and attached to the pad, and hooks extending upwardly from opposite sides of the ring and engaging the screws between the clamping members.

ETHEL C. DERKS.